United States Patent
Tanaka et al.

[11] Patent Number: 6,137,559
[45] Date of Patent: Oct. 24, 2000

[54] METHOD OF MANUFACTURING A LIQUID CRYSTAL DISPLAY DEVICE USING AN AIRTIGHT SEAL PATTERN

[75] Inventors: Kazunari Tanaka; Yoshinori Tanaka, both of Ishikawa, Japan

[73] Assignee: Matsushita Electric Industrial Co., Ltd., Osaka, Japan

[21] Appl. No.: 09/183,095

[22] Filed: Oct. 30, 1998

[30] Foreign Application Priority Data

Oct. 30, 1997 [JP] Japan ..................................... 9-297619

[51] Int. Cl.[7] ................................................. G02F 1/1339
[52] U.S. Cl. ........................................... 349/153; 349/190
[58] Field of Search .................... 349/130, 153, 349/154

[56] References Cited

U.S. PATENT DOCUMENTS

| | | | |
|---|---|---|---|
| 5,406,398 | 4/1995 | Suzuki et al. | 349/154 |
| 5,410,423 | 4/1995 | Furushima et al. | 349/153 |
| 5,499,127 | 3/1996 | Tsubota et al. | 359/80 |
| 5,515,188 | 5/1996 | Miles et al. | 349/153 |
| 5,558,732 | 9/1996 | Hamon | 349/187 |
| 5,568,297 | 10/1996 | Tsubota et al. | 359/80 |
| 5,592,288 | 1/1997 | Sampica et al. | 349/153 |
| 5,598,286 | 1/1997 | Yanagi | 349/58 |
| 5,610,742 | 3/1997 | Hinata et al. | 349/153 |
| 5,677,749 | 10/1997 | Tsubota et al. | 359/80 |
| 5,684,555 | 11/1997 | Shiba et al. | 349/153 |
| 5,793,461 | 8/1998 | Inou | 349/153 |

FOREIGN PATENT DOCUMENTS

| | | |
|---|---|---|
| 62-231928 | 10/1987 | Japan . |
| 07181506 | 7/1995 | Japan . |

*Primary Examiner*—Kenneth Parker
*Attorney, Agent, or Firm*—Ratner & Prestia

[57] ABSTRACT

A method of manufacturing LCD devices utilizes atmospheric pressure. An LCD seal pattern is formed on a glass substrate. An airtight seal pattern is formed along the periphery of the glass substrate. The glass substrate is aligned with another glass substrate. The two glass substrates are placed together in a vacuum. The vacuum is leaked to atmospheric pressure (the standard barometric pressure). Thus a uniform cell gap is formed.

24 Claims, 5 Drawing Sheets

METHOD OF MANUFACTURING A LIQUID CRYSTAL DISPLAY DEVICE USING AN AIRTIGHT SEAL PATTERN

FIELD OF THE INVENTION

The present invention relates to a method of manufacturing liquid crystal display (hereinafter abbreviated LCD) devices, in which highly precise cell gap on the order of a few μm with few dispersion is required. More particularly the present invention relates to a method of assembling LCD cells.

BACKGROUND OF THE INVENTION

Popular conventional methods of assembling LCD panels are those in which facing two glass substrates are aligned, then they are pressed by a pressing machine or by a vacuum pack method, then the sealing material patterned in advance on at least one of the glass substrates is cured by heat or by light (ultraviolet rays). The above vacuum pack method is that the facing two glass substrates are airtightly packed in a bag made of soft material, then the facing two glass substrates are pressed by the shrinking pressure of the bag when the air in the bag is exhausted.

In order to obtain a proper and precise cell gap of the LCD panels, so called spacers such as approximately 5 μm diameter balls made of polymer resin or glass, or approximately 5 μm diameter glass fibers are sprayed (dispersed) on at least one of the facing two glass substrates in advance. As to the material for sealing the facing two glass substrates, heat curing type or light (ultraviolet rays) curing type materials are used. The chief ingredient of these materials is epoxy resin. The sealing material is then patterned by a screen printing method or by a dispenser method on one of the two facing glass substrates.

Then the facing two glass substrates are aligned precisely by an image recognition system. Then, in order to obtain the uniform cell gap of substantially the same dimension as the diameter of above described spacers, the sealing material patterned on the substrate is cured while the facing two glass substrates are pressed by the pressing machine, or the sealing material is cured after the facing two glass substrates are pressed by the vacuum pack method.

However, in the conventional methods described above, there is the problem of occurrence of gap defect that the cell gap becomes locally narrower at the point where foreign matter sticks, and also there is the problem of occurrence of scratch defect due to the foreign matter on the glass substrates. Furthermore there is the problem that it is difficult to realize a uniform cell gap because the glass substrates often deform since pressing them evenly is difficult. And also, in the method of using pressing machine, the facilities become large, then the facility cost and the large space are disadvantageous. Moreover, in the vacuum pack method, there are problems that indirect material cost is high and loss from work inefficiency are large.

SUMMARY OF THE INVENTION

The present invention aims to provide a manufacturing method of an LCD device with which the manufacturing processes are improved, so that the improvement of work efficiency and cost reduction are realized, and also LCD devices of high display quality are obtainable.

The manufacturing method of the present invention utilizes atmospheric pressure in assembling LCD panels. The method comprises a process for forming LCD panel seal patterns for sealing the LCD panels on at least one of facing two glass substrates, a process for forming airtight seal pattern having a continuous line along the periphery of the glass substrate, and a process for aligning and sticking the facing two glass substrates in a vacuum ambiance.

Also the manufacturing method of the present invention is that after aligning and sticking the facing two glass substrates in a vacuum ambiance, the vacuum ambiance is leaked to atmospheric pressure, then by utilizing pressure difference between pressure degree in space sealed by the airtight seal pattern and the atmospheric pressure, the facing two glass substrates are pressed, so that a uniform cell gap of the LCD panels is formed.

Also the manufacturing method of the present invention is that after the facing two glass substrates are aligned in the vacuum ambiance and are pressed by the pressure difference between the vacuum degree in the space sealed by the airtight seal pattern and the atmospheric pressure by leaking the vacuum ambiance to the atmospheric pressure, the glass substrates are further kept in the atmospheric pressure until the airtight seal pattern is broken by the pressure difference and the space sealed by the airtight seal pattern leaks to the atmospheric pressure, and then the sealing material of the LCD seal patterns and the airtight seal pattern is cured. With the manufacturing method described above, the deformation of the glass substrates is decreased, and the display quality is thus improved.

DESCRIPTION OF THE PREFERRD EMBODIMENTS

First exemplary embodiment

Figure 1:
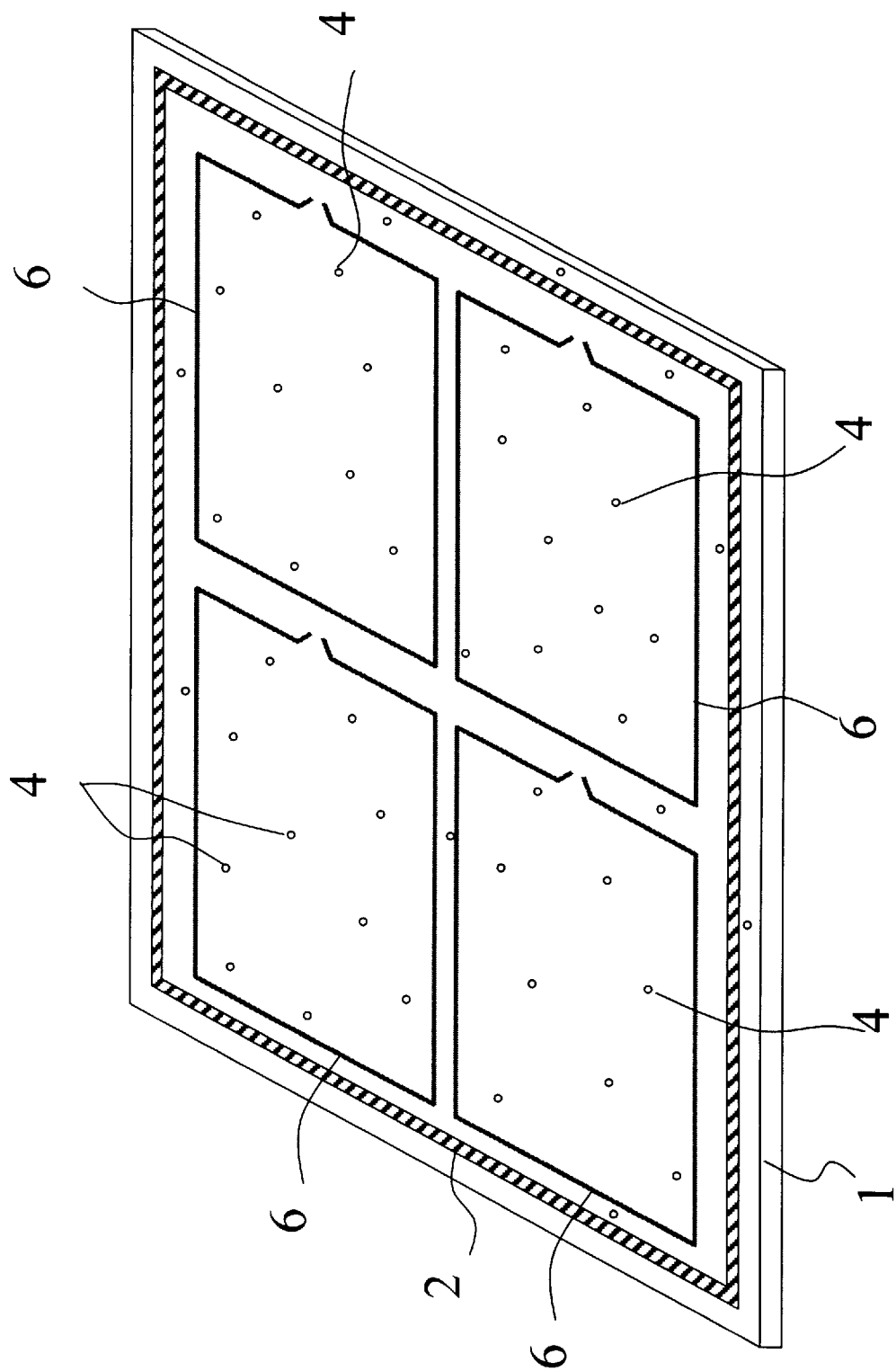
FIG. 1 is a perspective view showing a glass substrate on which airtight seal pattern and LCD panel seal patterns are formed according to a first and a second exemplary embodiment of the present invention.

The following is an explanation on a first exemplary embodiment of the present invention, in which FIG. 1 is referred to. The size of glass substrates 1 is approximately 300 mm square. On the inward facing surfaces of the glass substrates 1, electrodes for activating liquid crystal, color filters, switching elements, etc. are patterned according to their necessity, and the treatment for aligning liquid crystal molecules is provided, in advance. On at least one of the facing two glass substrates 1, LCD seal patterns 6 having respective openings as shown in FIG. 1 are formed for sealing LCD panels. In this exemplary embodiment, the patterns are provided to take four pieces of about six-inch diagonal LCD panels. On one of the facing two glass substrates, airtight seal pattern 2 having a continuous line is also formed along the periphery of the glass substrate as shown in the illustration. Then the facing two glass substrates 1 are aligned and placed in a vacuum ambiance.

The seal patterns 2 and 6 in FIG. 1 are formed by a screen printing method or by a dispenser method, typically. In the screen printing method, a screen plate #250 (250 lines/inch), emulsion thickness 75 μm, made of stainless steel is used. In the dispenser method, the patterning of sealing material is performed by using 0.3 mm inner diameter spray nozzle and by setting the gap between the nozzle and the glass substrate 1 at approximately 30 μm.

For the sealing material, ultraviolet curing type (heat curing type also usable) material whose chief ingredient is epoxy resin is used, and the viscosity and the thixotropy are adjusted to approximately 40–200 Pa.s and 3–5 respectively. In the sealing material, glass fiber of approximately 5 μm diameter is dispersed in advance as spacers for defining a cell gap.

After forming the seal patterns, plastic balls, as spacers 4, made of a bridging polymer whose chief ingredient is divinylbenzene are sprayed on the glass substrate 1. Then the facing two glass substrates 1 are aligned and stuck in the vacuum ambiance of a vacuum chamber. The line width of the seal pattern 2 is adjusted to approximately 2 mm by modifying the opening width of the screen plate, the squeeze speed and squeeze pressure of the screen printing method, or by modifying the dispenser speed of the dispenser method. The line width of the seal patterns 6 is adjusted to approximately 1 mm by the same modification as described above.

After that, the vacuum chamber is leaked to atmospheric pressure (the standard barometric pressure). Then the glass substrates 1 are pressed by utilizing the pressure difference between the vacuum degree in the space sealed by the airtight seal pattern 2 and the atmospheric pressure. After that, the material of the airtight seal pattern 2 and the LCD panel seal patterns 6 are cured by the irradiation of ultraviolet rays, which is the final process of assembling LCD cells. At this time, the vacuum degree in the vacuum chamber is approximately 10 Pa, and it takes approximately 3 seconds until the chamber is leaked to the atmospheric pressure.

The optimum vacuum degree in the vacuum chamber is different depending on the volume of the used sealing material, that is, the size of the LCD panel. When the LCD panel size is small, the number of the LCD patterns formed in the facing two glass substrates 1 increases, so that the total area of the LCD seal pattern lines becomes large, then the volume of used sealing material also becomes large. In this case the relatively higher degree of the vacuum is better for degassing. For instance, for the LCD panel size of one to two-inch diagonal, the vacuum degree of approximately 1 Pa is desirable. On the other hand, for the LCD panel size of seven-inch or larger diagonal, less volume of the sealing material is used, so that the relatively low vacuum degree of approximately 10 Pa is better because the deforming stress on the glass substrates is smaller.

In this exemplary embodiment, as described above, by utilizing the pressure difference between the vacuum degree and the atmospheric pressure, the glass substrates are pressed under condition that nothing touches the glass substrates except air, so that the gap defect caused by foreign matter and the scratch defect by scratching the surfaces of the glass substrates are decreased, thus low defective rate in assembling processes is realized. And also, since the pressure on a unit area of the facing two glass substrates is equal, stress on the LCD seal pattern is decreased, so that the break of the seal pattern is prevented. Also, a uniform cell gap is realized, so that the LCD devices of high display quality are obtainable. In addition, comparing with the conventional method of using pressing machine, the curtailment of cost and space of the facilities is realized. Also, comparing with the conventional vacuum pack method, indirect material cost and loss from work inefficiency are decreased. Also, since the facing two glass substrates are aligned in the vacuum ambiance, the seal patterns are degassed at the same time, so that good sealing is formed.

Second exemplary embodiment

Figure 2:
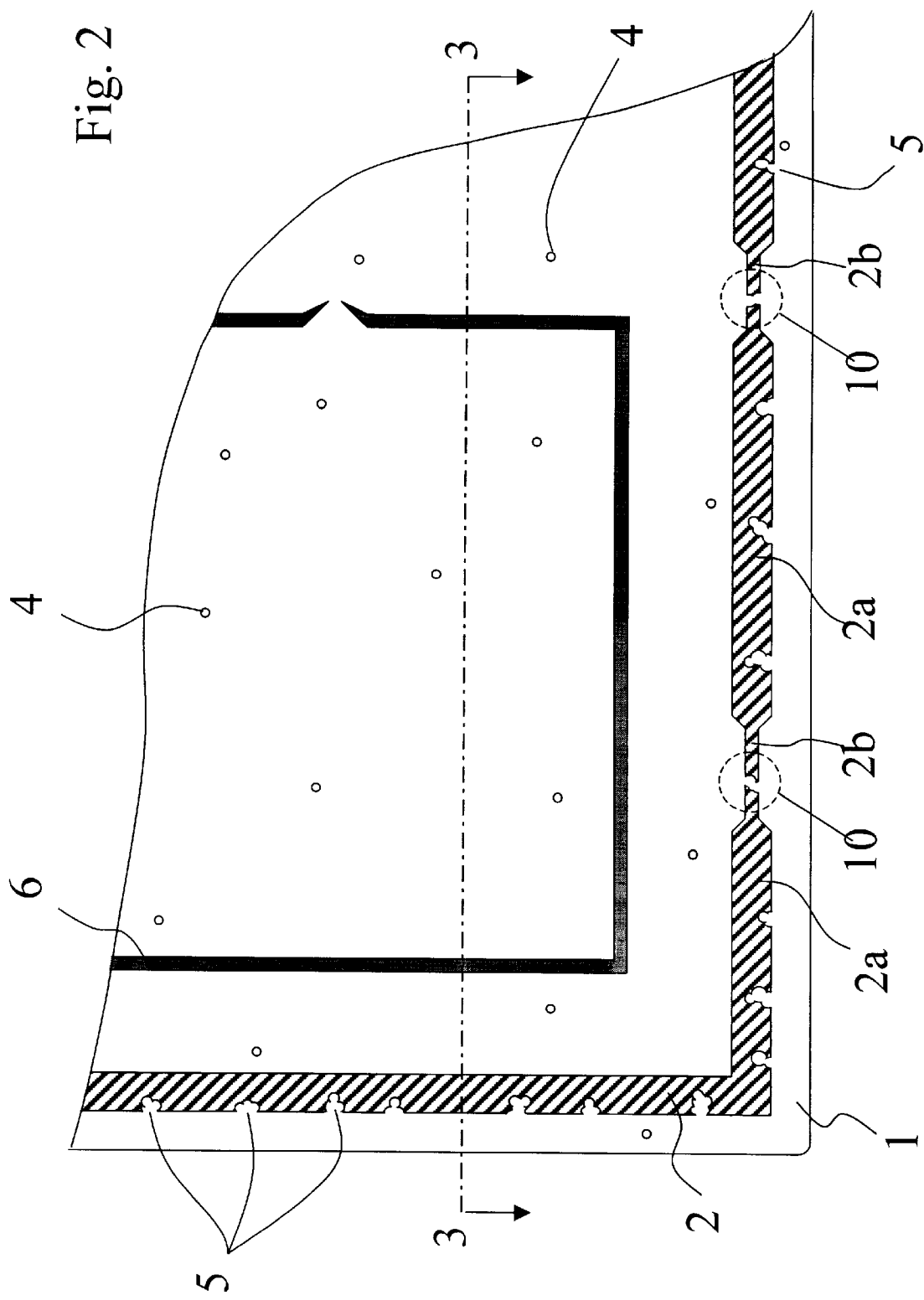
FIG. 2 is an enlarged fragmentary plan view showing assembled glass substrates according to the second exemplary embodiment of the present invention.

The following is an explanation on a second exemplary embodiment of the present invention, in which FIG. 1 through FIG. 5 are referred to. In this exemplary embodiment also, as in the first exemplary embodiment, on a glass substrate 1 on which electrodes, etc. are formed and treatment of aligning liquid crystal molecules is provided in advance, airtight seal pattern 2 and LCD seal patterns 6 are formed, and spacers 4 are sprayed. 25 After that, the facing two glass substrates 1 of the LCD panel are aligned and stuck in the vacuum ambiance of a vacuum chamber. In this exemplary embodiment, different from the first exemplary embodiment, on airtight seal pattern, some narrow width portions 2a are formed while the pattern has mostly wide width portions 2a as shown in FIG. 2. The line width of the wide width portion 2a and the line width of the narrow width portion 2a are adjusted to 2 mm and 1mm respectively in this exemplary embodiment.

In some span of time after the vacuum chamber is leaked to atmospheric pressure, air bubbles as shown by numeral 5 in FIG. 2 begin to penetrate into the airtight seal pattern which is not yet cured, from several outside points. Then some points 10 of the narrow width portions in FIG. 2 are broken by the bubbles penetrated through the narrow width portions. Then the space sealed by the airtight seal pattern 2 gradually leaks to the atmospheric pressure through the broken portions. After the space sealed by the airtight seal pattern leaks to the atmospheric pressure, the airtight seal pattern 2 and the LCD seal patterns 6 are cured by irradiation of ultraviolet rays. At this time, by disposing a plurality of the narrow width portions 2b substantially symmetrically about the center of the surface of the glass substrate, a uniform cell gap is formed in a time span of as short as approximately 15–30 seconds after the airtight seal pattern is broken.

Figure 3:
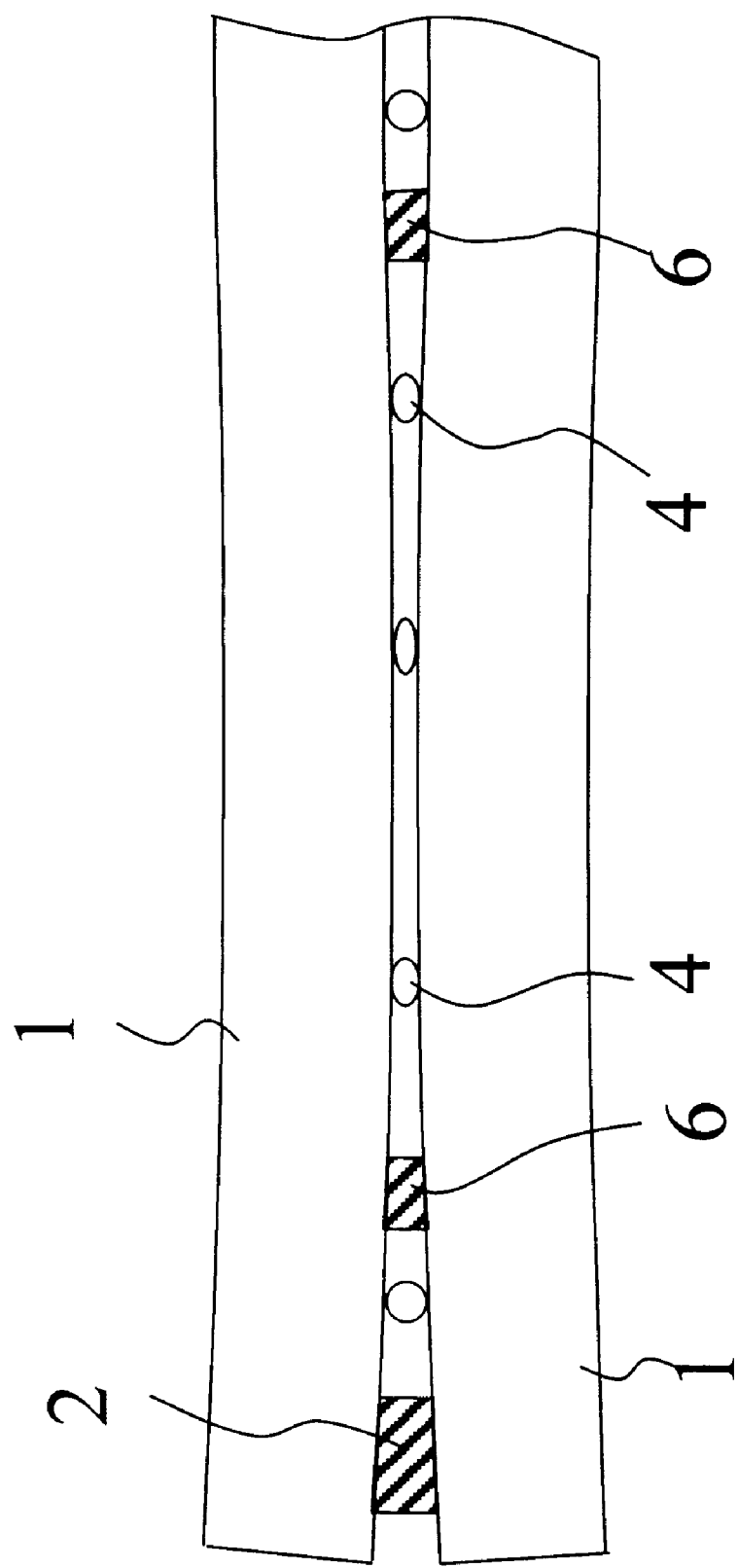
FIG. 3 is an enlarged view showing the cross section of the thickness direction of the assembled glass substrates, along cutting-plane line 3—3 in FIG. 2, right after a vacuum chamber is leaked to atmospheric pressure, according to the second exemplary embodiment of the present invention.
Figure 4:
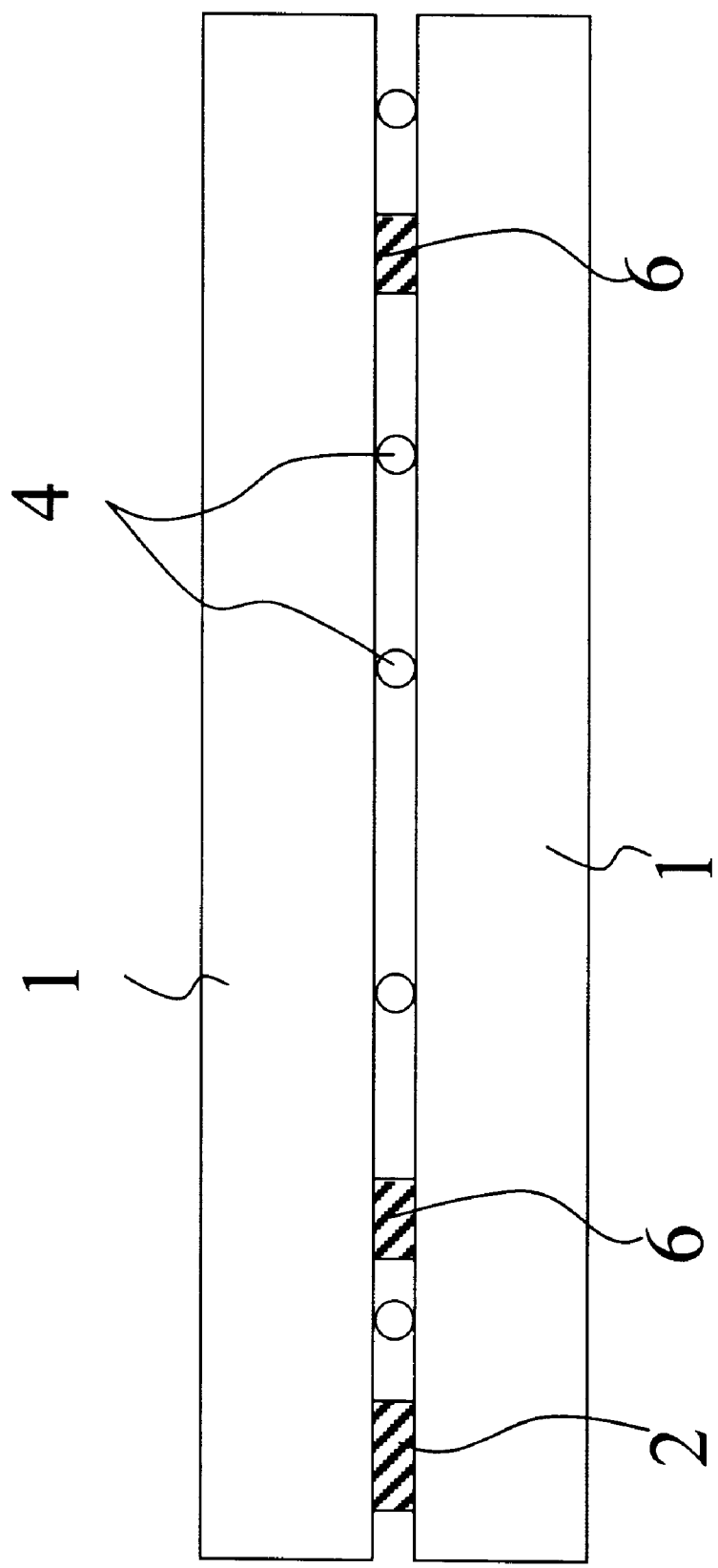
FIG. 4 is an enlarged view showing the cross section of the thickness direction of the assembled glass substrates, along the -cutting-plane line in FIG. 2, at the time when space sealed by the airtight seal pattern has leaked to the atmospheric pressure, according to the second exemplary embodiment of the present invention.

FIG. 3 is an enlarged view showing the cross section of the thickness direction of the assembled glass substrates, along cutting-plane line 3—3 in FIG. 2, right after a vacuum chamber is leaked to atmospheric pressure. In this state, the cell gap is not necessarily uniform due to residual stresses in the glass substrates, so that the gap at the over-pressed portions becomes narrower than the diameter of the spacers, and the glass substrates are sometimes deformed. However, after the airtight seal pattern 2 is broken and the space sealed by the airtight seal pattern 2 leaks to the atmospheric pressure, the deformation of the glass substrates disappears and the cell gap becomes uniform as shown in FIG. 4.

In this exemplary embodiment, as described above, even though there is dispersion of deformation of the LCD panel by the atmospheric pressure as shown in FIG. 3, by utilizing the leak through break of the airtight seal pattern, the dispersion of the deformation is reduced. Thus the stable and uniform cell gap is realized.

Figure 5:
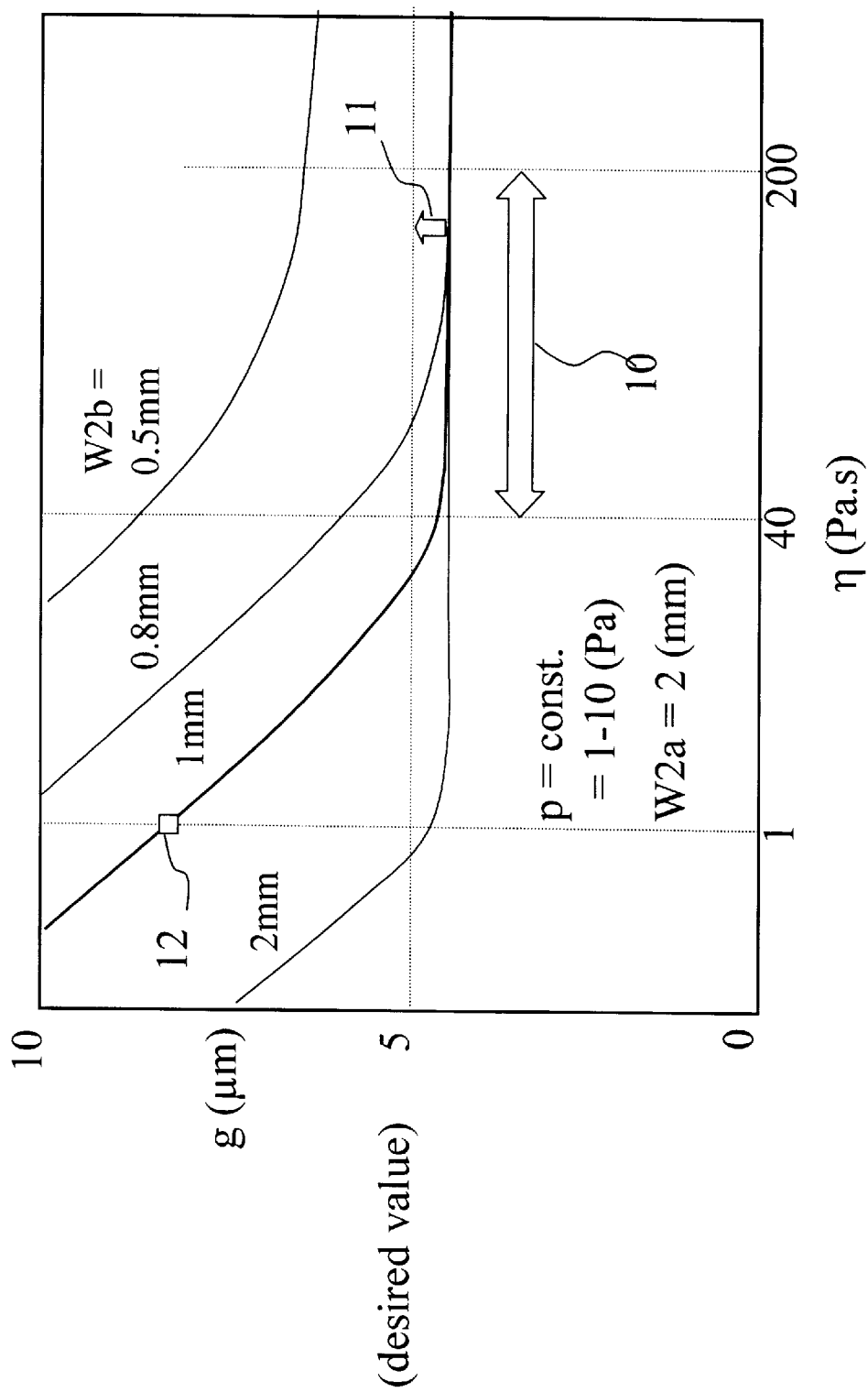
FIG. 5 is a graph showing the relationship between the viscosity of the airtight seal and the cell gap just after the airtight seal is broken, taking he width of the narrow width portion of the airtight seal as parameters, according to the second exemplary embodiment of the present invention.

It is important that the viscosity of the airtight sealing material and the line width of the narrow width portion of the airtight seal pattern are set in the manner that the airtight seal pattern breaks after the facing two glass substrates are pressed till the cell gap becomes narrower than the desired dimension when the vacuum chamber is leaked to the atmospheric pressure. If the viscosity of the sealing material is too low or the line width of the airtight seal pattern is too narrow, it happens that the desired gap is not obtained because the airtight seal pattern leaks before the facing two glass substrates are sufficiently pressed. This will be explained in more detail using the graph in FIG. 5. FIG. 5 shows the relationship between the viscosity η of the airtight seal and the obtained cell gap g just after the airtight seal is broken, when the line widths W2b of the narrow width portion of the airtight seal pattern are W2b=0.5 mm, 0.8 mm, 1 mm and 2 mm respectively. The vacuum degree during assembling processes is kept constant (1–10 Pa) and the line widths W2a of the wide width portion of the airtight seal pattern is kept constant (W2a=2 mm). The abscissa is expressed in a logarithmic scale but the viscosity range η=40–200 Pa.s in the abscissa is magnified as shown by an arrow 10 in FIG. 5. In this graph, the condition of the viscosity range η=40–200 Pa.s and the line width W2b =1 mm is adopted in this exemplary embodiment. In this favorable case the cell gap g just after the airtight seal is broken becomes smaller than the desired value that is 5 μm, and after that the gap g recovers gradually to the desired value 5 μm as shown by an arrow 11 in FIG. 5. If the viscosity η is for example as low as η=1 Pa.s, the airtight seal breaks before the cell gap g reaches the desired value 5 μ and the obtained cell gap g remains considerably wider than the desired value 5 μm as shown by the small square mark 12 in FIG 5. When the seal line width is W2b=0.8 mm, the viscosity η of the airtight seal must be increased to more than 100 Pa.s in order to obtain the cell gap g smaller than the desired value 5 μm. When the seal line width W2b is further decreased to 0.5 mm, the airtight seal breaks before the cell gap g reaches the desired value 5 μm even when the airtight seal of higher viscosity η is used. If the line width W2b of the narrow width portion of the airtight seal is set as wide as 2 mm, the viscosity η of the airtight seal can be decreased to 1 Pa.s satisfying the cell gap 5 μm condition. However, because the line widths of narrow width portion and of wide width portion become same in this case, the portions where the airtight seal breaks cannot be controlled in advance, resulting in poor uniformity of the cell gap g after the airtight seal pattern breaks.

As shown in FIG. 2, by forming at least one different line width portion on the airtight seal pattern 2, namely, by forming the airtight seal pattern with wide portions 2a and at least one narrow portion 2b, the positions broken when the vacuum chamber is leaked to atmospheric pressure are determined in advance, so that the time span that the space sealed by the airtight seal pattern leaks to the atmospheric pressure is shortened, and the uniformity of the cell gap is improved.

The present invention, as described above, provides an LCD device manufacturing method with which the deformation of glass substrates is decreased and more uniform cell gap of LCD panels is realized more constantly.

Also, with the manufacturing method, as described above, curtailment of cost and facility space and improvement of work efficiency are realized at LCD cell assembling processes. Also, the gap defect caused by foreign matter and the scratch defect from the scratches on the surfaces of glass substrates are decreased at the assembling processes. Furthermore, since the pressure of a unit area on the glass substrates during the assembling processes is equal, deformation of the glass substrates is decreased, so that the display quality of the LCD devices is improved.

What is claimed is:

1. A method of manufacturing an LCD device having first and second glass substrates, comprising the steps of:

forming an LCD panel seal pattern on the first glass substrate;

forming an airtight seal pattern having a continuous line along a periphery of one of the first glass substrate and second glass substrate; and aligning and placing together the first glass substrate with the second glass substrate in a vacuum chamber after the airtight seal pattern is formed.

2. The method of manufacturing LCD devices according to claim 1, further comprising the step of:

forming a uniform cell gap of the LCD device by leaking the vacuum to atmospheric pressure and pressing together the first and second glass substrates by atmospheric pressure.

3. The method of manufacturing LCD devices according to claim 2, further comprising the step of:

curing the airtight seal pattern and the LCD panel seal pattern.

4. The method of manufacturing LCD devices according to claim 3, wherein, the vacuum degree of the vacuum is controlled according to the amount of sealing material used for forming the LCD seal pattern.

5. The method of manufacturing LCD devices according to claim 3, wherein, said airtight seal pattern includes first width portions and at least one second width portion which is narrower than the first width portions.

6. The method of manufacturing LCD devices according to claim 3, wherein, the line of the airtight seal pattern is broken after said cell gap becomes narrower than desired dimension.

7. The method of manufacturing LCD devices according to claim 2, wherein, the vacuum degree of the vacuum is controlled according to the amount of sealing material used for forming the LCD seal pattern.

8. The method of manufacturing LCD devices according to claim 7, wherein first width portions and at least one second width portion of the airtight seal pattern are formed along the periphery of the first glass substrate, the second width portion is narrower in width than the first width portions.

9. The method of manufacturing LCD devices according to claim 8, wherein the airtight seal pattern has a plurality of the narrower second width portions, and the narrower second width portions are disposed substantially symmetrically about the center of the surface of one of the first and second glass substrates.

10. The method of manufacturing LCD devices according to claim 9, wherein, the line of the airtight seal pattern is broken after said cell gap becomes narrower than desired dimension.

11. The method of manufacturing LCD devices according to claim 10, wherein, the viscosity of the airtight seal pattern is approximately 40 to 200 Pa.s and the width of the narrower width portion of the airtight seal pattern is more than 1 mm.

12. The method of manufacturing LCD devices according to claim 8, wherein, the line of the airtight seal pattern is broken after said cell gap becomes narrower than desired dimension.

13. The method of manufacturing LCD devices according to claim 12, wherein the viscosity of the airtight seal pattern is approximately 40 to 200 Pa.s and the width of the narrower width portion of the airtight seal pattern is more than 1 mm.

14. The method of manufacturing LCD devices according to claim 7, wherein, the line of the airtight seal pattern is broken after said cell gap becomes narrower than desired dimension.

15. The method of manufacturing LCD devices according to claim 14, wherein, the viscosity of the airtight seal pattern is approximately 40 to 200 Pa.s and the width of the narrower width portion of the airtight seal pattern is more than 1 mm.

16. The method of manufacturing LCD devices according to claim 2, wherein, the line of the airtight seal pattern is broken after said cell gap becomes narrower than desired dimension.

17. The method of manufacturing LCD devices according to claim 16, wherein, the viscosity of the airtight seal pattern is approximately 40 to 200 Pa.s and the width of the narrower width portion of the airtight seal pattern is more than 1 mm.

18. The method of manufacturing LCD devices according to claim 2, wherein, said airtight seal pattern includes first width portions and at least one second width portion which is narrower than the first width portions.

19. The method of manufacturing LCD devices according to claim 1, wherein, said airtight seal pattern includes first width portions and at least one second width portion which is narrower than the first width portions.

20. The method of manufacturing LCD devices according to claim 19, wherein the airtight seal pattern has a plurality of the narrower second width portions, and the narrower second width portions are disposed substantially symmetrically about the center of the surface of one of the first and second glass substrates.

21. The method of manufacturing LCD devices according to claim 20, wherein, the line of the airtight seal pattern is broken after said cell gap becomes narrower than desired dimension.

22. The method of manufacturing LCD devices according to claim 21, wherein, the viscosity of the airtight seal pattern is approximately 40 to 200 Pa.s and the width of the narrower width portion of the airtight seal pattern is more than 1 mm.

23. The method of manufacturing LCD devices according to claim 19, wherein, the line of the airtight seal pattern is broken after said cell gap becomes narrower than desired dimension.

24. The method of manufacturing LCD devices according to claim 23, wherein, the viscosity of the airtight seal pattern is approximately 40 to 200 Pa.s and the width of the narrower width portion of the airtight seal pattern is more than 1 mm.

* * * * *